No. 729,961. PATENTED JUNE 2, 1903.
J. W. PERKINS.
SLED.
APPLICATION FILED FEB. 6, 1903.
NO MODEL.
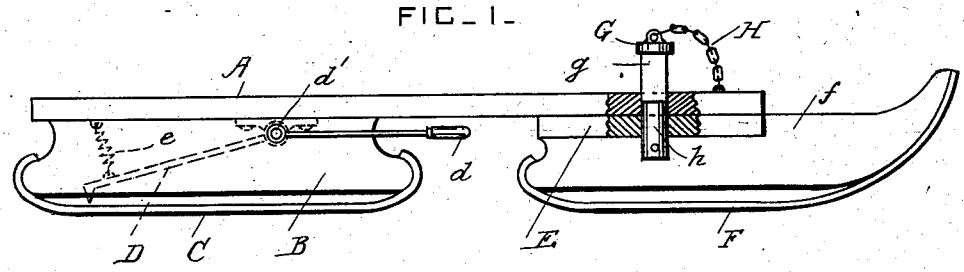
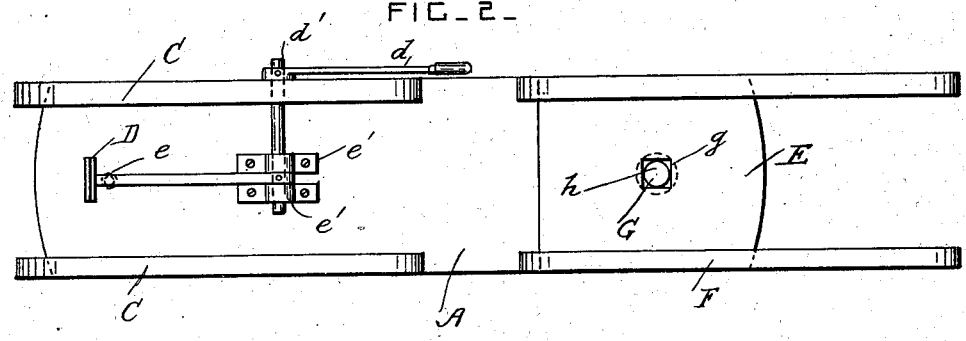
WITNESSES
Walter Allen
Chas. K. Davies
INVENTOR
John W. Perkins
by Herbert W. J. Jenner
Attorney No. 729,961. Patented June 2, 1903.

UNITED STATES PATENT OFFICE.

JOHN W. PERKINS, OF EVERETT, MASSACHUSETTS.

SLED.

SPECIFICATION forming part of Letters Patent No. 729,961, dated June 2, 1903.

Application filed February 6, 1903. Serial No. 142,158. (No model.)

*To all whom it may concern:*

Be it known that I, JOHN W. PERKINS, a citizen of the United States, residing at Everett, in the county of Middlesex and State of Massachusetts, have invented certain new and useful Improvements in Sleds; and I do hereby declare the following to be a full, clear, and exact description of the invention, such as will enable others skilled in the art to which it appertains to make and use the same.

This invention relates to sleds; and it consists in the novel construction and combination of the parts hereinafter fully described and claimed.

In the drawings, Figure 1 is a side view of the sled, partly in section. Fig. 2 is a plan view of the sled from below.

A is the main platform of the sled, provided with side plates B at its rear part, to which runners C are secured.

D is a spring-supported brake arranged under the middle part of the platform A. The brake D has a handle $d$, secured on the brake-shaft $d'$, which is journaled in bearings $e'$, secured to the platform A. A spring $e$ normally holds the brake D in its raised position.

E is an auxiliary frame arranged under the front part of the main platform A.

F represents runners secured to the side plates $f$ of the frame E.

The frame E is connected to the platform A by a slidable pin or bolt G. When the bolt G is depressed, the frame E is locked to the platform, so that it cannot turn. When the bolt G is raised, the frame E is free to turn pivotally on it. The connection may be formed in any approved manner; but the bolt G is preferably provided with a rectangular upper portion $g$, which fits in the holes in the platform and in the frame. When the bolt is raised, the circular part $h$ of it comes inside the hole in the frame E, so that the frame E is free to turn pivotally upon it.

H is a chain to prevent the pin or bolt from being raised too high.

When the sled is first started, the frame E is locked to the platform A. When the sled gets well in motion, the pin is raised and the sled is steered in the usual manner, the brake being used when necessary to retard its speed.

What I claim is—

1. In a sled, the combination, with a main platform, and runners secured to its rear part; of a frame provided with runners and arranged under the front part of the platform, and a slidable pivot-bolt which normally locks the frame to the platform, substantially as set forth.

2. In a sled, the combination, with a main platform, and runners secured to its rear part; of a brake carried by the said platform, a frame provided with runners and arranged under the front part of the platform, and a slidable pivot-bolt provided with a rectangular portion which normally locks the said frame to the platform, substantially as set forth.

In testimony whereof I affix my signature in presence of two witnesses.

JOHN W. PERKINS.

Witnesses:
ALICE J. MURRAY,
FREDK. K. DAGGETT.